(12) United States Patent
Gill et al.

(10) Patent No.: US 11,579,991 B2
(45) Date of Patent: Feb. 14, 2023

(54) DYNAMIC ALLOCATION OF COMPUTE RESOURCES AT A RECOVERY SITE

(71) Applicant: Nutanix, Inc., San Jose, CA (US)

(72) Inventors: Binny Sher Gill, San Jose, CA (US); Jan Olderdissen, Herrenberg (DE); Rajiv Mirani, Los Gatos, CA (US); Miao Cui, San Jose, CA (US)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 17/210,012

(22) Filed: Mar. 23, 2021

(65) Prior Publication Data

US 2021/0232469 A1    Jul. 29, 2021

Related U.S. Application Data

(63) Continuation of application No. 15/956,036, filed on Apr. 18, 2018, now Pat. No. 10,963,356.

(51) Int. Cl.
*G06F 11/20* (2006.01)
*G06F 9/455* (2018.01)

(52) U.S. Cl.
CPC ...... *G06F 11/2094* (2013.01); *G06F 9/45558* (2013.01); *G06F 2009/45583* (2013.01); *G06F 2201/815* (2013.01)

(58) Field of Classification Search
CPC ............. G06F 11/2046; G06F 11/2094; G06F 11/2041; G06F 11/2025
See application file for complete search history.

(56) References Cited

U.S. PATENT DOCUMENTS

| | | | |
|---|---|---|---|
| 6,115,830 | A | 9/2000 | Zabarsky et al. |
| 7,516,221 | B2 * | 4/2009 | Souder ............. G06F 9/5061 |
| | | | 709/229 |
| 8,086,895 | B2 | 12/2011 | Maki et al. |
| 8,195,976 | B2 | 6/2012 | Rao et al. |
| 8,549,518 | B1 | 10/2013 | Aron et al. |
| 8,572,138 | B2 | 10/2013 | Sundar et al. |
| 8,601,473 | B1 | 12/2013 | Aron et al. |
| 8,700,946 | B2 | 4/2014 | Reddy et al. |
| 8,850,130 | B1 | 9/2014 | Aron et al. |
| 8,863,124 | B1 | 10/2014 | Aron |
| 9,009,106 | B1 | 4/2015 | Aron et al. |
| 9,027,024 | B2 | 5/2015 | Mick et al. |
| 9,069,708 | B2 | 6/2015 | Gill et al. |

(Continued)

OTHER PUBLICATIONS

Gupta, Upasna "Ten Things You Need to Know About Nutanix Data Protection and Disaster Recovery", Nutanix; https://next.nutanix.com/archive-44/ten-things-you-need-to-know-about-nutanix-data-protection-and-disaster-recovery-16010 2017 [captured Aug. 10, 2021], pp. 1-5.

(Continued)

*Primary Examiner* — Nadeem Iqbal
(74) *Attorney, Agent, or Firm* — Stoel Rives LLP

(57) ABSTRACT

Examples of systems are described herein which may dynamically allocate compute resources to recovery clusters. Accordingly, a recovery site may utilize fewer compute resources in maintaining recovery clusters for multiple associate clusters, while ensuring that, during use, compute resources are allocated to a particular cluster. This may reduce and/or avoid vulnerabilities arising from a use of shared resources in a virtualized and/or cloud environment.

30 Claims, 5 Drawing Sheets

(56) References Cited

U.S. PATENT DOCUMENTS

| | | | |
|---|---|---|---|
| 9,176,829 | B2 | 11/2015 | Jain et al. |
| 9,336,132 | B1 | 5/2016 | Aron et al. |
| 9,652,265 | B1 | 5/2017 | Narayanasamy et al. |
| 9,747,176 | B2 | 8/2017 | Oppermann |
| 9,747,287 | B1 | 8/2017 | Bhardwaj et al. |
| 9,772,866 | B1 | 9/2017 | Aron et al. |
| 9,836,234 | B2 | 12/2017 | Colgrove et al. |
| 9,848,041 | B2 | 12/2017 | Einkauf et al. |
| 9,921,769 | B2 | 3/2018 | Aron et al. |
| 9,948,711 | B2 | 4/2018 | Cors et al. |
| 10,002,058 | B1 | 6/2018 | Shanmugam et al. |
| 10,305,747 | B2 | 5/2019 | Shahab et al. |
| 10,346,252 | B1 | 7/2019 | Gould et al. |
| 10,372,565 | B2 | 8/2019 | Peng et al. |
| 10,467,216 | B2 | 11/2019 | Aron et al. |
| 10,657,012 | B2 | 5/2020 | Madduri et al. |
| 10,671,445 | B2 | 6/2020 | Nucci et al. |
| 10,776,213 | B2 | 9/2020 | Chakankar et al. |
| 10,831,525 | B2 | 11/2020 | Ramesh et al. |
| 10,846,079 | B2 | 11/2020 | Olderdissen et al. |
| 10,846,129 | B2 | 11/2020 | Hermenier |
| 10,877,791 | B2 | 12/2020 | Ramesh et al. |
| 10,895,997 | B2 | 1/2021 | Franciosi et al. |
| 10,963,283 | B2 | 3/2021 | Lu et al. |
| 10,963,356 | B2 | 3/2021 | Gill et al. |
| 2006/0130042 | A1 | 6/2006 | Dias et al. |
| 2007/0233698 | A1 | 10/2007 | Sundar et al. |
| 2010/0250824 | A1 | 9/2010 | Belay |
| 2015/0089504 | A1 | 3/2015 | Hartman et al. |
| 2015/0339200 | A1* | 11/2015 | Madduri ............ G06F 11/1425 714/4.11 |
| 2015/0370502 | A1* | 12/2015 | Aron ................ G06F 3/0626 711/162 |
| 2016/0179635 | A1 | 6/2016 | Kondalsamy et al. |
| 2016/0204977 | A1 | 7/2016 | Cui et al. |
| 2016/0246528 | A1 | 8/2016 | Colgrove et al. |
| 2016/0323377 | A1 | 11/2016 | Einkauf et al. |
| 2016/0378622 | A1 | 12/2016 | Ren et al. |
| 2018/0165166 | A1 | 6/2018 | Wang et al. |
| 2018/0302340 | A1 | 10/2018 | Alvarez Callau et al. |
| 2019/0235978 | A1 | 8/2019 | Wu et al. |
| 2019/0317869 | A1 | 10/2019 | Selvaraj et al. |
| 2019/0324874 | A1 | 10/2019 | Gill et al. |
| 2020/0150946 | A1 | 5/2020 | Olderdissen et al. |
| 2020/0249973 | A1 | 8/2020 | Ramesh et al. |

OTHER PUBLICATIONS

"Autoscale Service Engines", AVI Networks, https://avinetworks.com/docs/16.3/autoscale-service-eneines/ Captured Aug. 4, 2021; pp. 1-5.
Denneman, Frank "VMware Cloud on AWS—A Closer Look", VMware vSphere Blog; https://blogs.vmware.com/vsphere/2016/10/vmware-cloud-on-aws-a-closer-look.htm Oct. 13, 2016, pp. 1-6.
Denneman, Frank "VMWare Cloud On AWS—Elastic DRS Preview", https://frankdenneman.nl/2016/10/18/vmware-cloud-aws-elastic-drs/ Oct. 18, 2016, pp. 1-4.
Radhakrishnan, Rajesh "Elastic DRS For VMware Cloud On AWS", VMArena; https://vmarena.com/elastic-drs-for-vmware-cloud-on-aws/ Jun. 6, 2021; pp. 1-20.
"Cohesity SiteContinuity", https://www.cohesity.com/products/sitecontinuity/, Cohesity, 2021, pp. 1-4.
"Disaster Recovery", https://www.cohesity.com/solutions/disaster-recovery/, Cohesity, 2021, pp. 1-4.
"Modernize Backup And Recovery", https://www.cohesity.com/solutions/backup-and-recovery/, Cohesity, 2021, pp. 1-5.
Miller, T. "The Disaster Recovery Reality Check", https://www.cohesity.com/blogs/the-disaster-recovery-reality-check/, Cohesity May 21, 2020, pp. 1-3.
U.S. Appl. No. 16/191,377 titled "System and Method for the Dynamic Expansion of a Cluster With Co Nodes Before Upgrade", filed Nov. 14, 2018; pp. all.
U.S. Appl. No. 15/956,036, titled "Dynamic Allocation of Compute Resources at a Recovery Site", filed Apr. 18, 2018, pp. all.
United States Arm Research Laboratory "Dynamically Allocated Virtual Clustering Management System (DAVC)"; www.arl.army.mil.www/default.cfm?page=2488 [retrieved Oct. 17, 2017], Retrieved from Internet Archive; pp. all https://web.archive.org/web/20171017023707/https://www.arl.army.mil/www/default.cfm?page=2488 Jun. 5, 2020, pp. all.
Epping, D. "Scale Up/Out and Impact of vRAM?!? (part 2", Yellow-Bricks.com [online], 2011 [retrieved May 9, 2020], Retrieved from Internet: www.yellow-bricks.com/20110/07/21/scale-upout-and-impact-of-vram-part-2, May 9, 2020, pp. 1-6.
Poitras, Steven. "The Nutanix Bible" (Oct. 15, 2013), from http://stevenpoitras.com/the-nutanix-bible/ (Publication date based on indicated capture date by Archive.org; first publication date unknown); pp. all.
Poitras, Steven. "The Nutanix Bible" (Jan. 11, 2014), from http://stevenpoitras.com/the-nutanix-bible/ (Publication date based on indicated capture date by Archive.org; first publication date unknown); pp. all.
Poitras, Steven. "The Nutanix Bible" (Jun. 20, 2014), from http://stevenpoitras.com/the-nutanix-bible/ (Publication date based on indicated capture date by Archive.org; first publication date unknown); pp. all.
Poitras, Steven. "The Nutanix Bible" (Jan. 7, 2015), from http://stevenpoitras.com/the-nutanix-bible/ (Publication date based on indicated capture date by Archive.org; first publication date unknown); pp. all.
Poitras, Steven. "The Nutanix Bible" (Jun. 9, 2015), from http://stevenpoitras.com/the-nutanix-bible/ (Publication date based on indicated capture date by Archive.org; first publication date unknown); pp. all.
Poitras, Steven. "The Nutanix Bible" (Sep. 4, 2015), from https://nutanixbible.com/; pp. all.
Poitras, Steven. "The Nutanix Bible" (Jan. 12, 2016), from https://nutanixbible.com/ ; pp. all.
Poitras, Steven. "The Nutanix Bible" (Jun. 9, 2016), from https://nutanixbible.com/; pp. all.
Poitras, Steven. "The Nutanix Bible" (Jan. 3, 2017), from https://nutanixbible.com/; pp. all.
Poitras, Steven. "The Nutanix Bible" (Jun. 8, 2017), from https://nutanixbible.com/; pp. all.
Poitras, Steven. "The Nutanix Bible" (Jan. 3, 2018), from https://nutanixbible.com/; pp. all.
Poitras, Steven. "The Nutanix Bible" (Jun. 25, 2018), from https://nutanixbible.com/; pp. all.
Poitras, Steven. "The Nutanix Bible" (Jan. 8, 2019), from https://nutanixbible.com/; pp. all.
Poitras, Steven. "The Nutanix Bible" (Jul. 25, 2019), from https://nutanixbible.com/; pp. all.
Poitras, Steven. "The Nutanix Bible" (Sep. 17, 2019), from https://nutanixbible.com/; pp. all.
Cano, Ignacio et al. "Curator: Self-Managing Storage for Enterprise Clusters"; University of Washington; published Mar. 2017; pp. all.
Poitras, Steven. "The Nutanix Bible" (Mar. 2, 2020), from https://nutanixbible.com/; pp. all.
Poitras, Steven. "The Nutanix Bible" (Sep. 1, 2020), from https://nutanixbible.com/; pp. all.
Poitras, Steven. "The Nutanix Bible" (Mar. 2, 2021), from https://nutanixbibie.com/; pp. all.

* cited by examiner

DYNAMIC ALLOCATION OF COMPUTE RESOURCES AT A RECOVERY SITE

CROSS REFERENCE TO RELATED APPLICATIONS(S)

This application is a continuation of pending U.S. patent application Ser. No. 15/956,036 filed Apr. 17, 2018. The aforementioned application is incorporated herein by reference, in its entirety, for any purpose.

TECHNICAL FIELD

Examples described herein relate generally to virtualized systems. Examples of systems for adding compute resources to a recovery duster responsive to a recovery event are described.

BACKGROUND

A virtual machine (VM) generally refers to a software-based implementation of a machine in a virtualization environment, in which the hardware resources of a physical computer (e.g., CPU, memory, etc.) are virtualized or transformed into the underlying support for the fully functional virtual machine that can run its own operating system and applications on the underlying physical resources just like a real computer.

Virtualization generally works by inserting a thin layer of software directly on the computer hardware or on a host operating system. This layer of software contains a virtual machine monitor or "hypervisor" that allocates hardware resources dynamically and transparently. Multiple operating systems may run concurrently on a single physical computer and share hardware resources with each other. By encapsulating an entire machine, including CPU, memory, operating system, and network devices, a virtual machine may be completely compatible with most standard operating systems, applications, and device drivers. Most modern implementations allow several operating systems and applications to safely run at the same time on a single computer, with each having access to the resources it needs when it needs them.

One reason for the broad adoption of virtualization in modern business and computing environments is because of the resource utilization advantages provided by virtual machines. Without virtualization, if a physical machine is limited to a single dedicated operating system, then during periods of inactivity by the dedicated operating system the physical machine may not be utilized to perform useful work. This may be wasteful and inefficient if there are users on other physical machines which are currently waiting for computing resources. Virtualization allows multiple VMs to share the underlying physical resources so that during periods of inactivity by one VM, other VMs can take advantage of the resource availability to process workloads. This can produce great efficiencies for the utilization of physical devices, and can result in reduced redundancies and better resource cost management.

In public cloud environments, resources are usually shared between tenants. Amazon AWS, Microsoft's Azure and Google's GCP are examples of this design. The resources may employ common physical hardware (e.g., Intel CPUs). Vulnerabilities may be found in such hardware (e.g., the Spectre vulnerability), which may pose significant risks to customers of such clouds.

In the case of Spectre, a bad actor sharing a server with another tenant may be able to get a complete readout of all physical memory of that server—including any data stored in memory by or for other customers and worse, any secrets (such as encryption keys) stored in memory.

While barn-door-sized vulnerabilities such as Spectre may be rare, privilege escalation vulnerabilities (in which a bad actor restricted to a VM gains control of the hypervisor and with it control of other customer's VMs), may be far more common. Both types of vulnerabilities are exacerbated by the shared nature of today's public clouds.

Some cloud providers offer dedicated compute instances, in which CPU and memory are not shared, for example "dedicated instances" at Amazon AWS. However, storage and network is still shared between tenants, which retains the risk of noisy neighbor issues and also potential data disclosure between tenants due to bugs or vulnerabilities in the storage layer.

DETAILED DESCRIPTION

Certain details are set forth herein to provide an understanding of described embodiments of technology. However, other examples may be practiced without various of these particular details. In some instances, well-known circuits, control signals, timing protocols, and/or software operations have not been shown in detail in order to avoid unnecessarily obscuring the described embodiments. Other embodiments may be utilized, and other changes may be made, without departing from the spirit or scope of the subject matter presented here.

Examples described herein provide systems and methods for dynamically allocating compute resources to clusters. By allocating compute resources to clusters, examples may advantageously dedicate the compute resources to a particular cluster and/or tenant at a time, which may avoid and/or reduce the incidence of certain vulnerabilities arising from a use of shared resources. However, by providing an ability to allocate and de-allocate computing resources from clusters, a system suitable for services multiple tenants may reduce an overall number of nodes which must be available to service the multiple tenants—because the computing resources may be dynamically allocated to various tenants and/or clusters as needed.

Generally, instead of additional complete nodes (e.g. nodes having storage and compute functionality) getting assigned to a duster that is running out of compute resources, a compute-heavy (e.g., compute-only) node, which may also be referred to as a compute node, may be assigned from a pool of available resources. This compute-only node provides additional compute resources until no longer desired by the cluster.

Compute-only nodes can be assigned quickly (e.g., in minutes in some examples) and removed just as quickly to be reassigned when no longer used. More storage-intensive nodes may take significantly longer (e.g., hours) to add and/or remove from a cluster. This may be because to add and/or remove a storage-intensive node from a cluster, data in the cluster's storage pool may be redistributed to and/or from the storage of the storage-intensive node to integrate the storage-intensive node's storage into the duster's storage pool.

Figure 1:
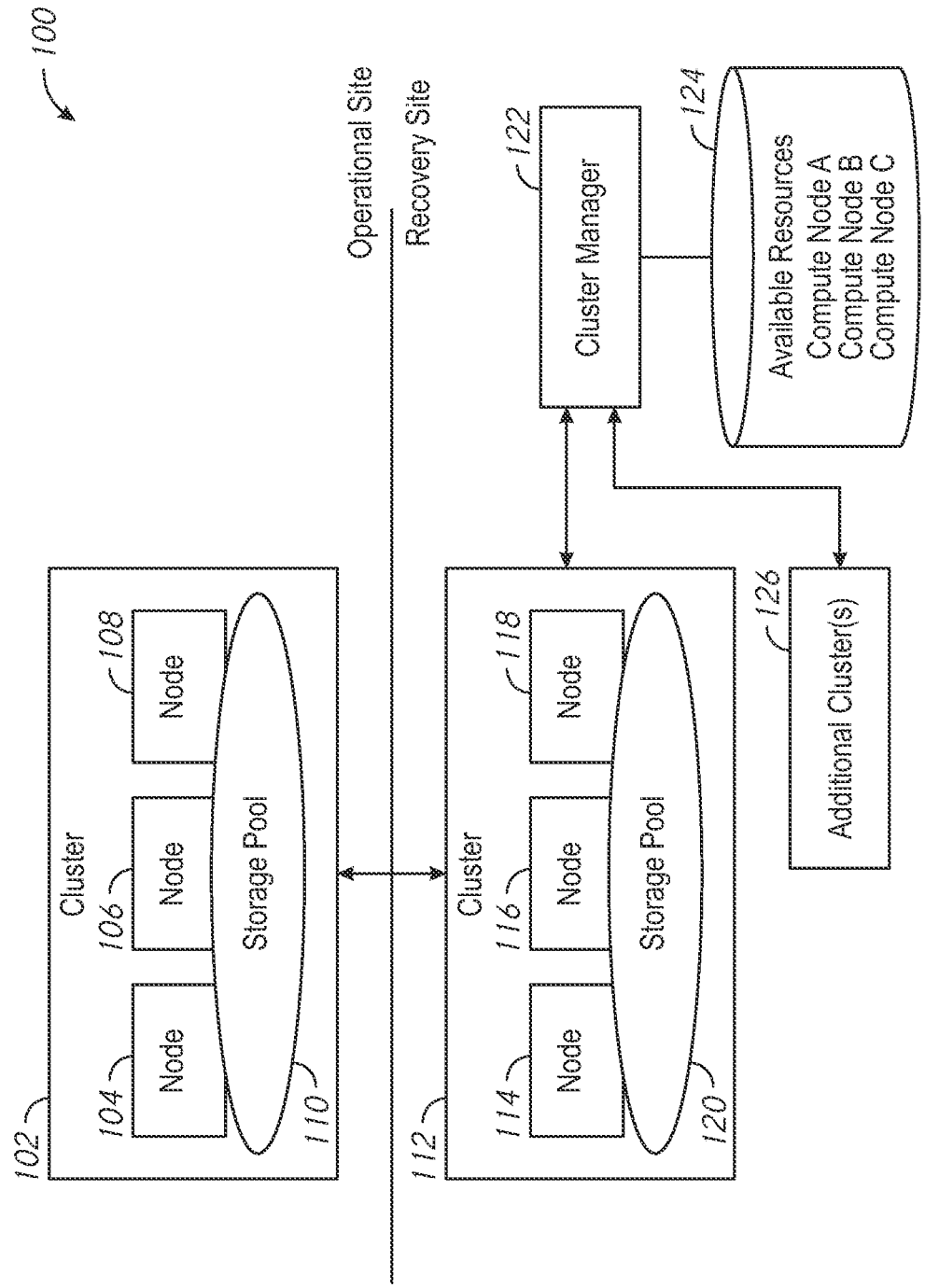
FIG. 1 is a schematic illustration of a system arranged in accordance with examples described herein.

FIG. 1 is a schematic illustration of a system arranged in accordance with examples described herein. The system 100 includes cluster 102, cluster 112, additional cluster(s) 126, cluster manager 122, and available resources 124. The cluster 102 may be located at an operational site. The cluster 102 includes node 104, node 106, node 108, and storage pool 110. The cluster 112 and additional cluster(s) 126 may be located at a recovery site. The duster 112 includes node 114, node 116, node 118, and storage pool 120. The cluster manager 122 may be in communication with cluster 112, additional cluster(s) 126, and available resources 124. The cluster 102 and cluster 112 may be in communication with one another. Additional, fewer, and/or different components may be used in other examples.

Examples described herein may provide one or more clusters at an operational site and one or more clusters at a recovery site. Generally, a cluster at a recovery site may be provided in order to facilitate continuous (and/or increased) availability of the functionality of the cluster following a recovery event. Examples of a recovery event include, for example, unavailability of some or all of a duster, destruction of some or all of a cluster, downtime of some or all of a cluster. A recovery event may be caused by a disaster, for example, such as a flood, a fire, explosion, nuclear blast, earthquake, or combinations thereof. Recovery events may have other causes, such as theft, component failure, manufacturing defects, or combinations thereof. In some examples, recovery events may not be related to emergency or disaster. For example, a scheduled launching of a large number of VMs or other general significant increase in resource demands may be a recovery event.

Accordingly, the recovery site may be a location which may be sufficiently distant from the operational site such that the cause of a recovery event affecting a cluster at the operational site may not affect a cluster at the operational site. Accordingly, responsive to the recovery event, a cluster at the operational site may "failover" to a cluster at the recovery site. The cluster at the recovery site may continue to make available similar data and/or functionality as the failed cluster at the operational site.

An operational site may be, for example, a business, a residence, a server farm, or other sites. A recovery site may be located in a different room, building, city, state, country, or location than the operational site. A cluster at the operational site may be in communication with a cluster at the recovery site over a network.

For example, the cluster 102 may be provided at the operational site. While a single cluster is shown at the operational site in FIG. 1, any number of clusters may be present in other examples. A cluster generally refers to a number of nodes which share a storage pool. The nodes may have a combination of computational capability (e.g., one or more processors), memory, and/or storage (e.g., one or more disks for storage of data). Nodes may run virtual machines, which may be executed using the computational resources of one or more of the nodes. In some examples, each node may include a hypervisor, at least one user virtual machine, a controller virtual machine, and storage. The storage provided by each of the nodes may be aggregated into a storage pool, such as storage pool 110. The controller virtual machine of each of the nodes may be used to manage input/output requests from the at least one user virtual machine to the storage pool.

For example, the cluster 102 includes node 104, node 106, and node 108. While three nodes are illustrated in cluster 102, any number of nodes may be used in various examples. Storage provided by node 104, node 106, and node 108 may be virtualized into storage pool 110 and made available to the nodes in cluster 102. Node 104, node 106, and node 108 may each host one or more virtual machines which utilize data stored in storage pool 110.

One or more recovery clusters may be provided at the recovery site. For example, the cluster 112 may be provided and may serve as a recovery cluster for the cluster 102. The recovery cluster may generally include a sufficient copy of the storage pool. 110 such that if all or a portion of the storage pool 110 became unavailable, the recovery cluster could facilitate continued access to the data. For example, the storage pool 120 may include the data of storage pool 110. During operation of the cluster 102, the cluster 102 may be in communication with the recovery cluster (e.g., cluster 112) to keep the storage pool up to date. For example, data from storage pool 110 may be mirrored and/or snapshotted to storage pool 120.

As shown, the cluster 112 includes three nodes—node 114, node 116, and node 118, although any number of nodes may be used. While three nodes are illustrated in both cluster 112 and cluster 102, in some examples the number of nodes in the recovery cluster may be greater or less than the number of nodes in the operational cluster. The nodes in the recovery cluster (e.g., cluster 112) may be different than the nodes in the operational cluster (e.g., cluster 102). For example, the recovery cluster may not in some examples provide all the functionality of the cluster 102 during normal operation. While the cluster 112 may maintain the data of storage pool 110 in storage pool 120, all the virtual machines running on the cluster 102 may not be maintained during normal operation at the cluster 112. Accordingly, the nodes used in the cluster 112 may have less computing resources (e.g., fewer processors and/or slower and/or smaller processors and/or less aggregate memory) than the nodes in the cluster 102. Generally, the cluster 112 may be a recovery cluster which may include nodes which have distributed access to a storage pool. The cluster 102 may communicate data to the cluster 112 to maintain the storage pool 120 in preparation for a recovery event.

The nodes of the cluster 112 may each include a hypervisor, a controller virtual machine, and storage. The storage of the nodes of the duster 112 may be used to form the storage pool 120.

The system 100 may include additional cluster(s) 126. The recovery site may accordingly include recovery clusters that may support any number of operational clusters and/or operational sites. The recovery site may include recovery clusters corresponding to any number of operational clusters in any number of locations. Moreover, the recovery site may include recovery clusters associated with any number of tenants. For example, each operational cluster may be associated with a tenant (e.g., a customer, a business, an enterprise). Multiple different tenants may be supported by the recovery site, which may, for example, be a site of a cloud service provider.

Examples described herein may include one or more cluster managers, such as cluster manager 122. The cluster manager may generally be implemented on any computing system, and may include one or more software and/or computer readable media encoded with executable instructions which may cause the cluster manager to perform the actions described. The cluster manager 122 may be in communication with cluster 112 and/or additional cluster(s) 126. The communication may be provided, e.g., over a network at the recovery site, for example.

Recall that, during operation of the cluster 102, the cluster 102 may communicate with the cluster 112 to maintain the storage pool 120 in preparation for a recovery event. Accordingly, during normal operation, the nodes of the cluster 112 may not utilize as much computing resources (e.g., processors) as the nodes of the cluster 102, which may be providing a variety of user virtual machines and/or other applications.

Responsive to a recovery event, however, the cluster 102 may be referred to as a failed cluster (e.g., some or all of the cluster 102, may be inaccessible, damaged, and/or destroyed). The failed cluster may failover to cluster 112. It may accordingly be desirable to migrate one or more virtual machines running on the nodes of the cluster 102 to the cluster 112. However, recall the nodes of the cluster 112 may have less computing resources (e.g., processors) than the nodes of the cluster 102.

Accordingly, to support failover, cluster managers described herein, such as cluster manager 122, may add computing resources to one or more recovery clusters responsive to a recovery event. The additional computing resources may be used to facilitate migration of virtual machines from the failed cluster to the recovery cluster (e.g., from cluster 102 to cluster 112).

Systems described herein, such as system 100, may accordingly include a number of nodes which may be unallocated at times. It may be undesirable (e.g., uneconomical in some examples) to provide dedicated computing resources for each recovery cluster supported by a recovery site (e.g., for cluster 112 and additional cluster(s) 126). Instead, computing resources may be made available that the cluster manager 122 can allocate to particular recovery clusters responsive to a recovery event implicating that cluster. The additional computing resources may be de-allocated when the recovery cluster is no longer being used to provide the virtual machines. The computing resources may then be reassigned to another recovery cluster when desired.

Accordingly, a database of available resources 124 may be provided in system 100 and may be accessible to the cluster manager 122. The database of available resources 124 may, for example, be a repository of unallocated computing resources (e.g., compute nodes). The database of available resources 124 may generally be stored in a memory or other electronic storage accessible to the cluster manager 122. The database of available resources 124 may not be stored in a database in some examples—list or other data structure may be used. In the example of FIG. 1, the available resources 124 may include three compute nodes—impute node A, compute node B, and compute node C. Generally, a compute node may refer to a node having computing resources, but perhaps little or no additional storage (e.g., drives). Accordingly, the computing resources available through compute nodes A, B, and/or C may be greater than those in the nodes of cluster 112. However, the storage provided by compute nodes A, B, and/or C may be less than the storage provided by the nodes of cluster 112.

During operation, the cluster manager 122 may receive an indication of a recovery event occurring. The indication may be provided, for example, from cluster 102 and/or cluster 112. The operational cluster and/or recovery cluster may, for example, provide an indication that all or a portion of the cluster 102 is unavailable and/or is becoming unavailable. The indication in some examples may be provided from an alarm or sensor at the operational site (e.g., a fire alarm, smoke detector, seismic detector, radiation detector), and/or by a complete loss of connectivity to cluster 102. Responsive to the indication of the recovery event, the cluster manager 122 may add compute resources to the cluster 112. The compute resource may be added, for example, by allocating available resources (e.g., one or more of compute nodes A, B, and/or C) to the cluster 112.

Note that the cluster manager 122 may be in communication with multiple clusters. Accordingly, the system 100 may include a number of additional, unallocated nodes for use by the cluster manager 122 which may be less than a sum of number of nodes used to support each cluster maintained at the recovery site. Because demand for the additional computing resources may fluctuate over time, fewer nodes may be used to support all the clusters at the recovery site if, as described herein, the cluster manager 122 may allocate and/or de-allocate the additional computing resources from recovery clusters over time.

Figure 2:
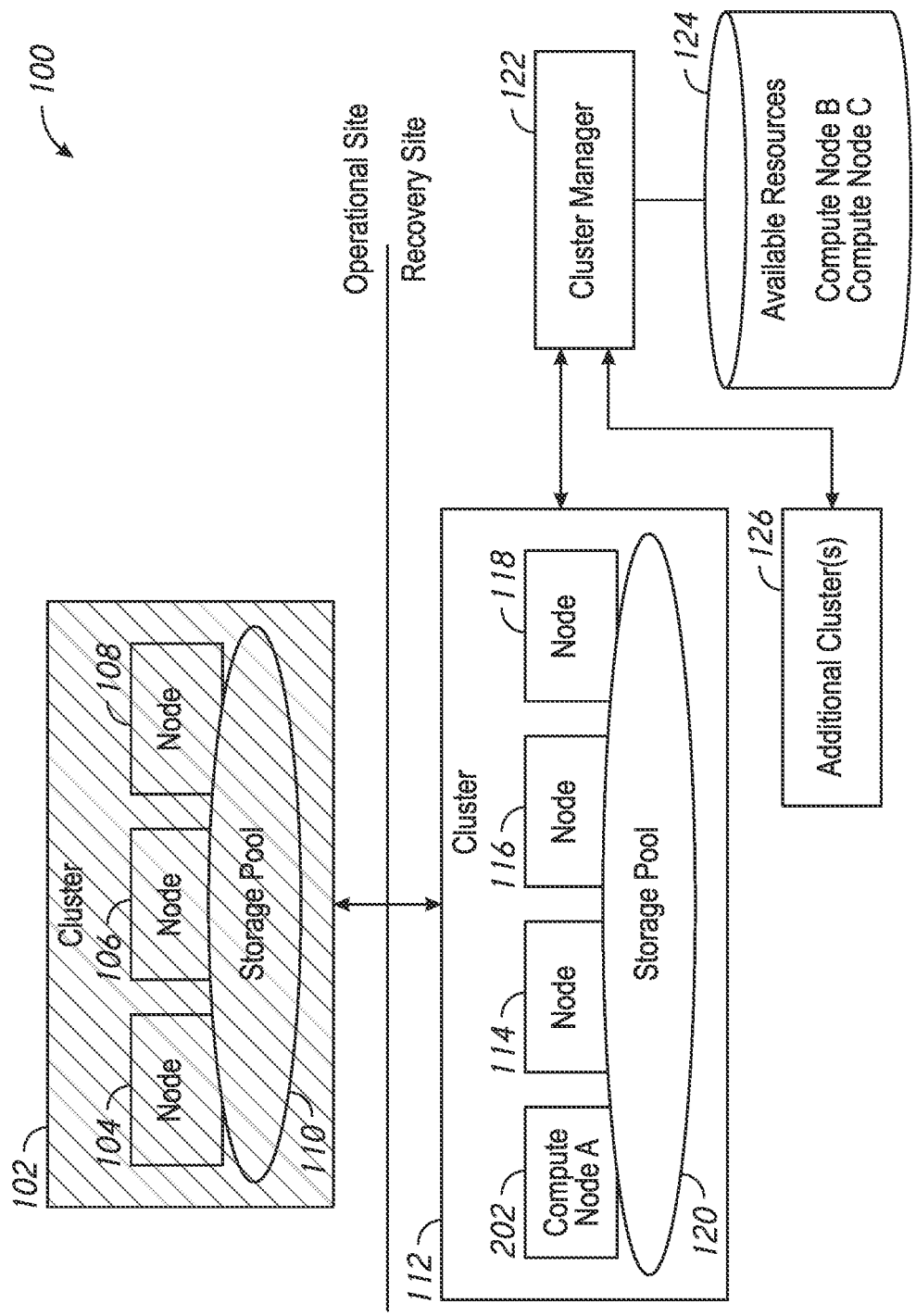
FIG. 2 is a schematic illustration of a system arranged in accordance with examples described herein.

FIG. 2 is a schematic illustration of a system arranged in accordance with examples described herein. FIG. 2 illustrates the system 100 during and/or following a recovery event. The system 100 is shown using the same reference numerals as FIG. 1. A recovery event has occurred, rendering the cluster 102 wholly and/or partially unavailable. Responsive to the recovery event, the cluster manager 122 in FIG. 2 has allocated compute node A 202 to the cluster 112. Moreover, the cluster manager 122 has added compute node A 202 to the cluster 112. Accordingly, the cluster manager 122 has removed compute node A 202 from the available resources 124, such that compute node A 202 no longer appears in the database of available resources 124. In some examples, instead of or in addition to removing the compute node A 202 from a list or other storage of available resources, an association may be stored between the compute node A 202 and the cluster 112.

The cluster manager 122 may select a particular available node from a plurality of available nodes to allocate to a recovery cluster using any of a variety of techniques. In some examples, an available node may be selected based on a rack location of the available nodes. For example, the cluster manager 122 may access data regarding the rack location (e.g., rack ID and/or slot ID) of each of the available nodes. The cluster manager 122 may additionally access data regarding the rack location of the recovery cluster (e.g., cluster 112). An available node may be allocated to the cluster 112 which shares a same rack and/or is in a closer rack and/or slot to at least one of the nodes of the cluster 112 than others of the available nodes. For example, the compute node A 202 may have been selected for addition to the cluster 112 because it may have been located in a same rack as one or more of the nodes of the cluster 112.

In some examples, an available node may be selected based on an amount of compute resources provided by the available compute nodes compared with a requested amount of compute resources from the failed cluster. An indication of a recovery event provided to the cluster manager 122 may, for example, include a requested amount of resources for responding to the recovery event. For example, an amount of compute resources may be requested that may be sufficient to migrate virtual machines of the failed cluster impacted by the recovery event. The cluster manager 122 may select a compute node, or combinations of compute nodes, that contain the requested amount of compute resources.

The selected compute node or nodes may then be allocated to a recovery cluster. For example, an association between the selected compute node and recovery cluster may be stored. The selected compute node may be added to the recovery cluster—e.g., compute node A 202 becomes a part of the cluster 112, and may host virtual machines migrated from the nodes cluster 102. The cluster 102 and/or cluster 112 may migrate one or more user virtual machines from nodes of the cluster 102 to the compute node A 202. The compute node A 202 may have access to the storage pool 120, such that the user virtual machines may continue to function, in an uninterrupted manner in some examples.

When the recovery event is over, and the operational cluster has been restored and/or a new operational cluster has been provided, the cluster manager 122 may receive an indication of an end of the recovery event. In some examples, the end of the recovery event may be indicated by monitoring usage of the additional computing resources added to a cluster (e.g., of compute node A 202). When no longer being used, the additional computing resource (e.g., compute node A 202) may be de-allocated from the cluster. The compute node A 202 may be removed from the cluster 112, and the available resources 124 updated to reflect that compute node A 202 is again available.

Should a recovery event occur that impacts one or more operational clusters associated with additional cluster(s) 126, the cluster manager 122 may receive an indication of the recovery event. The compute node A 202 may be available and the cluster manager 122 may allocate the compute node A 202 to one of the additional cluster(s) 126 associated with the operational cluster impacted by the recovery event.

Figure 3:
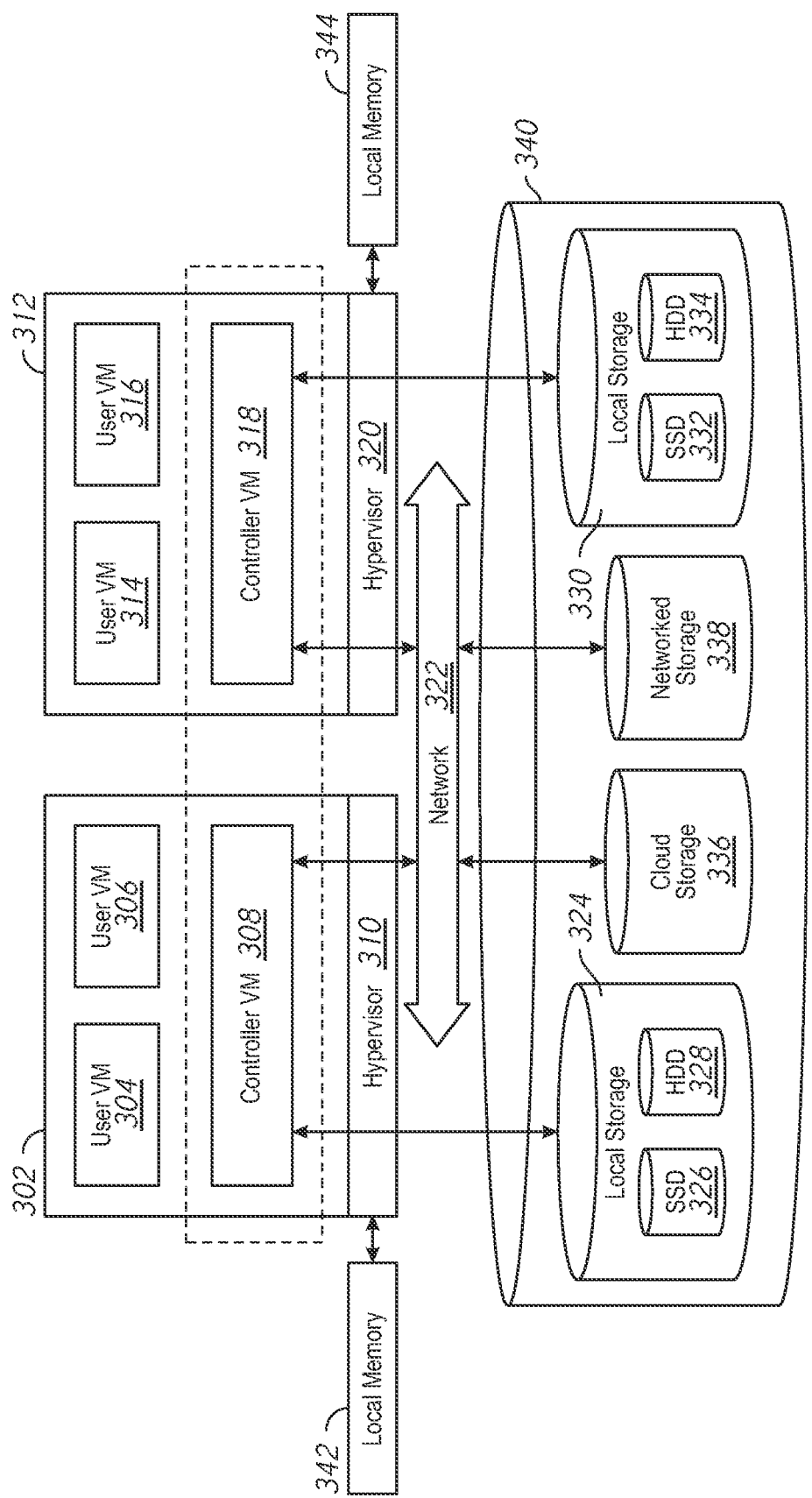
FIG. 3 is a block diagram of a distributed computing system, in accordance with embodiments described herein.

FIG. 3 is a block diagram of a distributed computing system, in accordance with embodiments described herein. The computing system shown in FIG. 3 may be used to implement the cluster 102 and/or cluster 112 of FIG. 1 in some examples. The distributed computing system of FIG. 3 generally includes node 302 and node 312 and storage 340 connected to a network 322. For example, the node 104 of FIG. 1 may be implemented using node 302, the node 106 of FIG. 1 may be implemented using node 312. The storage pool. 110 of FIG. 1 may be implemented using storage 340. The network 322 may be any type of network capable of routing data transmissions from one network device (e.g., node 302, node 312, and storage 340) to another. For example, the network 322 may be a local area network (LAN), wide area network (WAN), intranet, Internet, or a combination thereof. The network 322 may be a wired network, a wireless network, or a combination thereof.

The storage 340 may include local storage 324, local storage 330, cloud storage 336, and networked storage 338. The local storage 324 may include, for example, one or more solid state drives (SSD 326) and one or more hard disk drives (HDD 328). Similarly, local storage 330 may include SSD 332 and HDD 334. Local storage 324 and local storage 330 may be directly coupled to, included in, and/or accessible by a respective node 302 and/or node 312 without communicating via the network 322. Other nodes, however, may access the local storage 324 and/or the local storage 330 using the network 322. Cloud storage 336 may include one or more storage servers that may be stored remotely to the node 302 and/or node 312 and accessed via the network 322. The cloud storage 336 may generally include any type of storage device, such as HDDs SSDs, or optical drives.

Networked storage 338 may include one or more storage devices coupled to and accessed via the network 322. The networked storage 338 may generally include any type of storage device, such as HDDs SSDs, and/or NVM Express (NVMe). In various embodiments, the networked storage 338 may be a storage area network (SAN). The node 302 is a computing device for hosting virtual machines (VMs) in the distributed computing system of FIG. 1. The node 302 may be, for example, a server computer. The node 302 may include one or more physical computing components, such as processors.

The node 302 is configured to execute a hypervisor 310, a controller VM 308 and one or more user VMs, such as user VMs 104, 106. The user VMs including user VM 304 and user VM 306 are virtual machine instances executing on the node 302. The user VMs including user VM 304 and user VM 306 may share a virtualized pool of physical computing resources such as physical processors and storage (e.g., storage 340). The user VMs including user VM 304 and user VM 306 may each have their own operating system, such as Windows or Linux. While a certain number of user VMs are shown, generally any number may be implemented. User VMs may generally be provided to execute any number of applications which may be desired by a user.

The hypervisor 310 may be any type of hypervisor. For example, the hypervisor 310 may be ESX, ESX(i), Hyper-V, KVM, or any other type of hypervisor. The hypervisor 310 manages the allocation of physical resources (such as storage 340 and physical processors) to VMs (e.g., user VM 304, user VM 306, and controller VM 308) and performs various VM related operations, such as creating new VMs and cloning existing VMs. Each type of hypervisor may have a hypervisor-specific API through which commands to perform various operations may be communicated to the particular type of hypervisor. The commands may be formatted in a manner specified by the hypervisor-specific API for that type of hypervisor. For example, commands may utilize a syntax and/or attributes specified by the hypervisor-specific API.

Controller VMs (CVMs) described herein, such as the controller VM 308 and/or controller VM 318, may provide services for the user VMs in the node. As an example of functionality that a controller VM may provide, the controller VMs 308 may provide virtualization of the storage 140. Controller VMs may provide management of the distributed computing system shown in FIG. 1. Examples of controller VMs may execute a variety of software and/or may serve the I/O operations for the hypervisor and VMs running on that node. In some examples, a SCSI controller, which may manage SSD and/or HDD devices described herein, may be directly passed to the CVM, e.g., leveraging PCI Passthrough in some examples. In this manner, controller VMs described herein may manage input/output (I/O) requests between VMs on a node and available storage, such as storage 140.

The node 312 may include user VM 314, user VM 316, a controller VM 318, and a hypervisor 320. The user VM 314, user VM 316, the controller VM 318, and the hypervisor 320 may be implemented similarly to analogous components described above with respect to the node 302. For example, the user VM 314 and user VM 316 may be implemented as described above with respect to the user VM 304 and user VM 306. The controller VM 318 may be implemented as described above with respect to controller VM 308. The hypervisor 320 may be implemented as described above with respect to the hypervisor 310. In the embodiment of FIG. 3, the hypervisor 320 may be a different type of hypervisor than the hypervisor 310. For example, the hypervisor 320 may be Hyper-V, while the hypervisor 310 may be ESX(i). In some examples, the hypervisor 310 may be of a same type as the hypervisor 320.

The controller VM 308 and controller VM 318 may communicate with one another via the network 322. By linking the controller VM 308 and controller VM 318 together via the network 322, a distributed network of nodes including node 302 and node 312, can be created.

Controller VMs, such as controller VM 308 and controller VM 318, may each execute a variety of services and may coordinate, for example, through communication over network 322. Services running on controller VMs may utilize an amount of local memory to support their operations. For example, services running on controller VM 308 may utilize memory in local memory 342. Services running on controller VM 318 may utilize memory in local memory 344. The local memory 342 and local memory 344 may be shared by VMs on node 302 and node 312, respectively, and the use of local memory 342 and/or local memory 344 may be controlled by hypervisor 310 and hypervisor 320, respectively. Moreover, multiple instances of the same service may be running throughout the distributed system—e.g. a same services stack may be operating on each controller VM. For example, an instance of a service may be running on controller VM 308 and a second instance of the service may be running on controller VM 318.

Generally, controller VMs described herein, such as controller VM 308 and controller VM 318 may be employed to control and manage any type of storage device, including all those shown in storage 340 of FIG. 3, including local storage 324 (e.g., SSD 326 and HDD 328), cloud storage 336, and networked storage 338. Controller VMs described herein may implement storage controller logic and may virtualize all storage hardware as one global resource pool (e.g., storage 340) that may provide reliability, availability, and performance. IP-based requests are generally used (e.g., by user VMs described herein) to send I/O requests to the controller VMs. For example, user VM 304 and user VM 306 may send storage requests to controller VM 308 using over a virtual bus. Controller VMs described herein, such as controller VM 308, may directly implement storage and I/O optimizations within the direct data access path. Communication between hypervisors and controller VMs described herein may occur using IP requests.

Note that controller VMs are provided as virtual machines utilizing hypervisors described herein—for example, the controller VM 308 is provided behind hypervisor 310. Since the controller VMs run "above" the hypervisors examples described herein may be implemented within any virtual machine architecture, since the controller VMs may be used in conjunction with generally any hypervisor from any virtualization vendor.

Virtual disks (vDisks) may be structured from the storage devices in storage 340, as described herein. A vDisk generally refers to the storage abstraction that may be exposed by a controller VM to be used by a user VM. In some examples, the vDisk may be exposed via iSCSI ("internet small computer system interface") or NFS ("network file system") and may be mounted as a virtual disk on the user VM. For example, the controller VM 308 may expose one or more vDisks of the storage 340 and the hypervisor may attach the vDisks to one or more VMs, and the virtualized operating system may mount a vDisk on one or more user VMs, such as user VM 304 and/or user VM 306.

During operation, user VMs (e.g., user VM 304 and/or user VM 306) may provide storage input/output (I/O) requests to controller VMs (e.g., controller VM 308 and/or hypervisor 310). Accordingly, a user VM may provide an I/O request over a virtual bus to a hypervisor as an iSCSI and/or NFS request. Internet Small Computer System Interface (iSCSI) generally refers to an IP-based storage networking standard for linking data storage facilities together. By carrying SCSI commands over networks, iSCSI can be used to facilitate data transfers over intranets and to manage storage over any suitable type of network or the Internet. The iSCSI protocol allows iSCSI initiators to send SCSI commands to iSCSI targets at remote locations over a network. In some examples, user VMs may send I/O requests to controller VMs in the form of NFS requests. Network File System (NFS) refers to an IP-based file access standard in which NFS clients send file-based requests to NFS servers via a proxy folder (directory) called "mount point". Generally, then, examples of systems described herein may utilize an IP-based protocol (e.g., iSCSI and/or NFS) to communicate between hypervisors and controller VMs.

During operation, examples of user VMs described herein may provide storage requests. The storage requests may designate the IP address for a controller VM from which the user VM desires I/O services. The storage request may be provided from the user VM to a virtual switch within a hypervisor to be routed to the correct destination. For example, the user VM 304 may provide a storage request to hypervisor 310. The storage request may request I/O services from controller VM 308 and/or controller VM 318. If the request is to be intended to be handled by a controller VM in a same service node as the user VM (e.g., controller VM 308 in the same node as user VM 304) then the storage request may be internally routed within node 302 to the controller VM 308. In some examples, the storage request may be directed to a controller VM on another node.

Accordingly, the hypervisor hypervisor 310) may provide the storage request to a physical switch to be sent over a network (e.g., network 322) to another node running the requested controller VM (e.g., node 312 running controller VM 318).

Generally, VMs described herein may be presented with a virtual block device, to which the VM may send block commands, such as read and write. The hypervisor backs this virtual device and in turn forwards the 10 commands to a controller VM, using a protocol such as NFS or iSCSI. The interface between user VMs and the hypervisor can be a virtualized hard disk controller, such as SATA, or a virtualization-aware I/O bus using, for example, a ring buffer such as virtio.

Accordingly, hypervisors described herein may manage I/O requests between user VMs in a system and a storage pool. Controller VMs may virtualize I/O access to hardware resources within a storage pool according to examples described herein. In this manner, a separate and dedicated controller (e.g., controller VM) may be provided for each and every node within a virtualized computing system (e.g., a cluster of nodes that run hypervisor virtualization software), since each node may include its own controller VM. Each new node in the system may include a controller VM to share in the overall workload of the system to handle storage tasks. Therefore, examples described herein may be advantageously scalable, and may provide advantages over approaches that have a limited number of controllers. Consequently, examples described herein may provide a massively-parallel storage architecture that scales as and when hypervisor nodes are added to the system.

Figure 4:
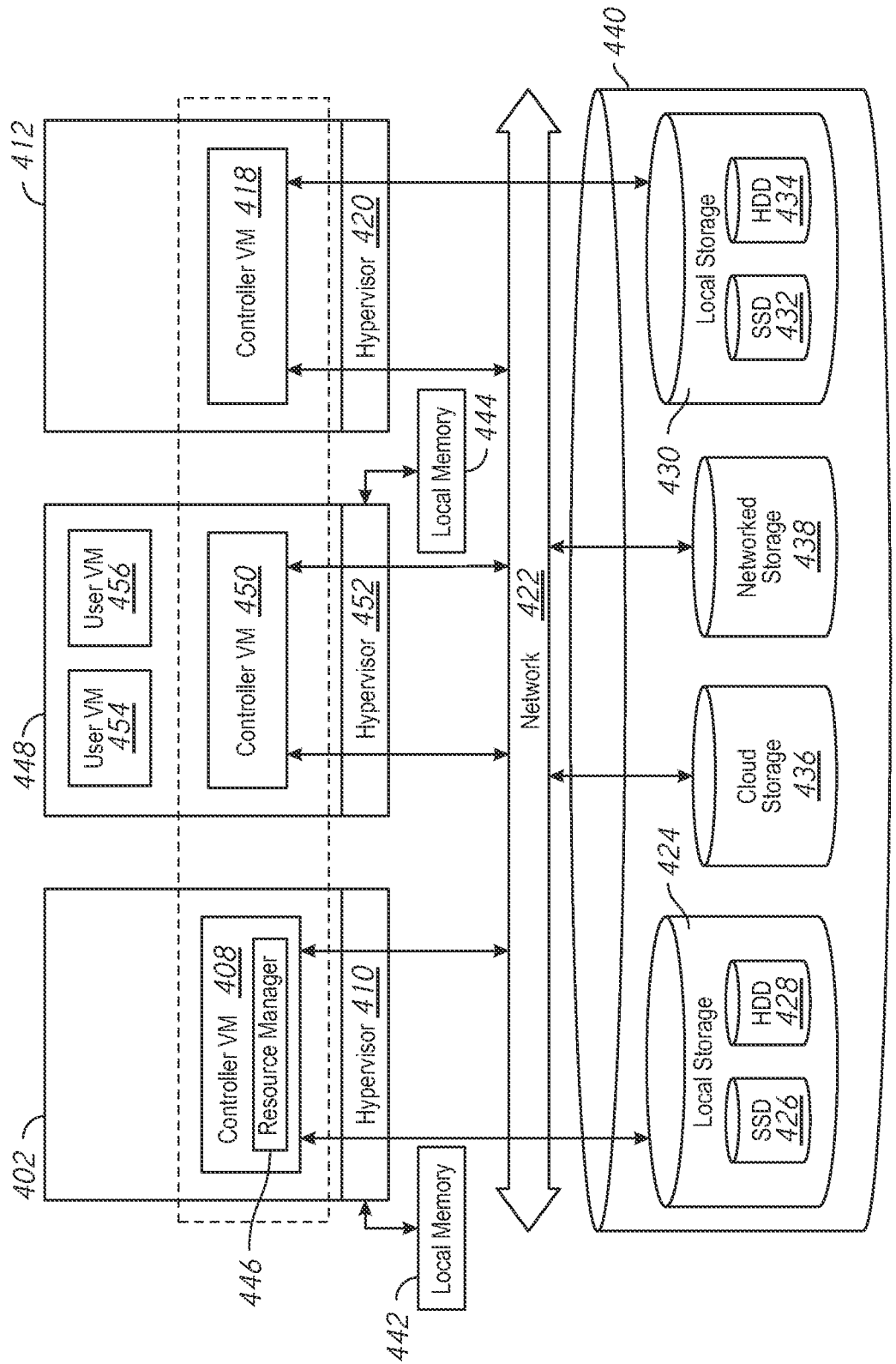
FIG. 4 is a block diagram of a distributed computing system, in accordance with embodiments described herein.

FIG. 4 is a block diagram of a distributed computing system, in accordance with embodiments described herein.

The system of FIG. 4 may have components analogous to those shown and described with reference to FIG. 3 using analogous reference numbers. The system of FIG. 4 may be used to implement a recovery cluster—e.g., cluster 112 of FIG. 1 in some examples. Accordingly, note that the node 402 and the node 412 may not include user VMs and/or may include fewer user VMs than nodes of a corresponding operational cluster (e.g., as shown in FIG. 3).

One or more of the controller VMs of a recovery cluster controller VM 408) may include a resource manager, shown as resource manager 446. The resource manager 446 may be in communication with a cluster manager (not shown in FIG. 4) to facilitate addition of allocated compute nodes to the cluster. For example, the resource manager 446 may facilitate addition of node 448 to the cluster. The node 448 may be used to implement, for example compute node A 202 of FIG. 2. Note that the node 448 may be a compute node—e.g., may have a greater amount of computing resources than node 402 and/or node 412, but may have less storage than node 402 and/or node 412. For example, the node 448 is depicted as not providing any additional local storage to the storage 440. The node 448, however, may have sufficient computing resources to host user VM 454 and/or user VM 456. In some examples, compute nodes may not include a controller virtual machine. For example, the controller VM 450 in node 448 of FIG. 4 may be optional. The controller VM 450 may not be used in some examples, because, for example, the node 448 may not provide any further local storage to the storage pool 440.

Consider an example operation of a system with reference to FIG. 4 and FIGS. 1-2. A recovery event may occur. Responsive to the recovery event, the resource manager 446 may detect and/or be communicated data regarding an increase in requested resources. The resource manager 446 may be in communication with a cluster manager, such as cluster manager 122 of FIGS. 1-2. The resource manager 446 may instruct cluster manager 122 to add particular resources to the recover cluster (e.g., the cluster of FIG. 4). The cluster manager 122 may select resources from a repository of available resources (e.g., available resources 124).

The cluster manager 122 may request that the node add the selected resources (e.g., one or more compute nodes) to the cluster, and may wait for an indication that the resources have been added to the cluster. The resource manager 446 may facilitate the addition of a node to the cluster and/or may provide the indication that the addition is complete. The resource manager 446 may communicate with other components of the cluster regarding the addition of a node (e.g., node 448) to the cluster. The resource manager 446 may then communicate with the cluster manager 122 that the resource addition is complete, and inform a management layer (e.g., one or more services in controller VMs) that additional resources are available. The controller VMs may accordingly spin up additional user VMs on the additional resources. For example, user VM 454 and/or user VM 456.

Figure 5:
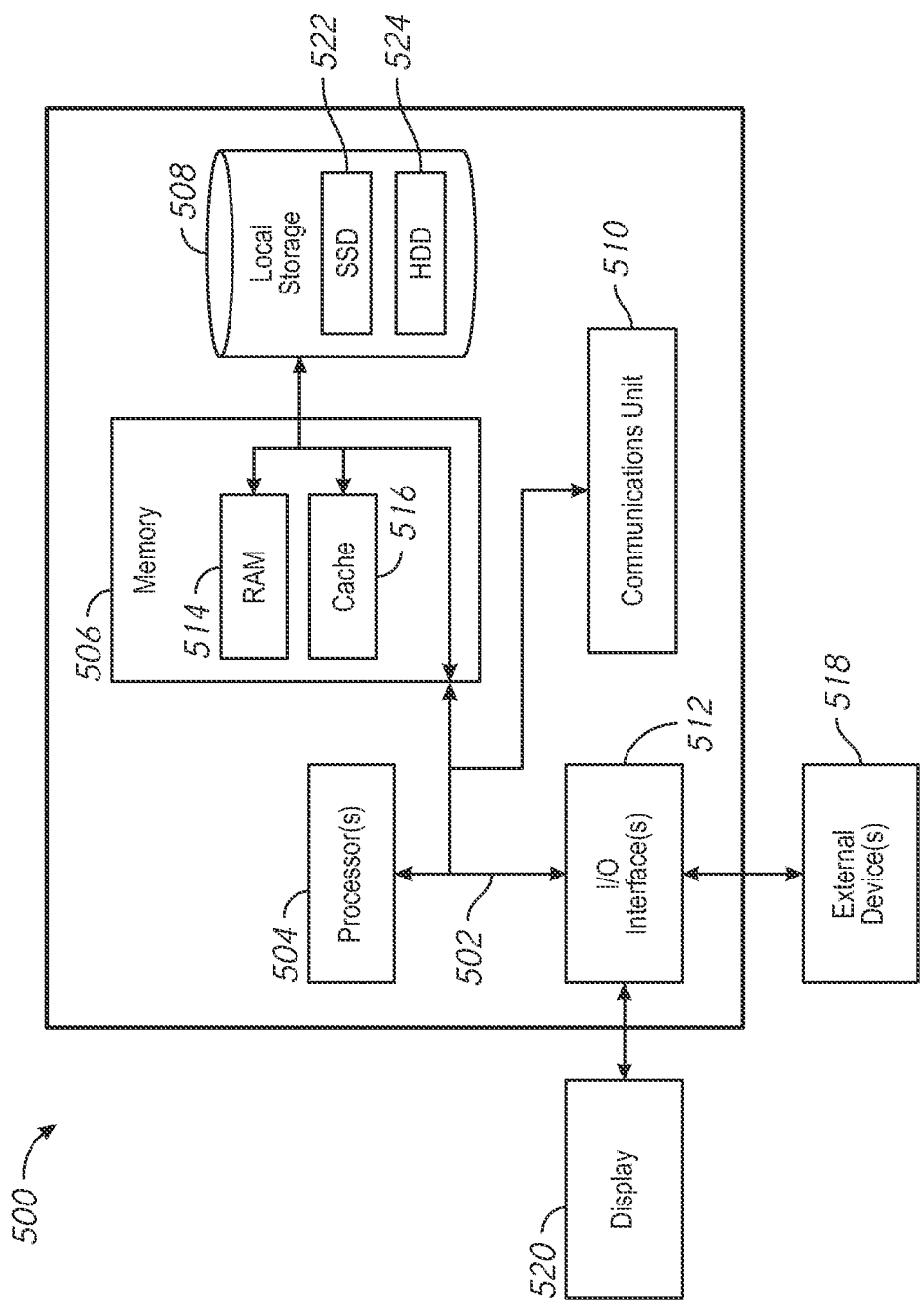
FIG. 5 depicts a block diagram of components of a node in accordance with examples described herein.

FIG. 5 depicts a block diagram of components of a node 500 in accordance with examples described herein. It should be appreciated that FIG. 5 provides only an illustration of one implementation and does not imply any limitations with regard to the environments in which different embodiments may be implemented. Many modifications to the depicted environment may be made. The node 500 may implemented as the node 302 and/or node 312 in some examples.

The node 500 includes one or more communications fabric(s) 502, which provides communications between one or more processor(s) 504, memory 506, local storage 508, communications unit 510, I/O interface(s) 512. The communications fabric(s) 502 can be implemented with any architecture designed for passing data and/or control information between processors (such as microprocessors, communications and network processors, etc.), system memory, peripheral devices, and any other hardware components within a system. For example, the communications fabric 502 can be implemented with one or more buses.

The memory 506 and the local storage 508 are computer-readable storage media. In this embodiment, the memory 506 includes random access memory RAM 514 and cache 516. In general, the memory 506 can include any suitable volatile or non-volatile computer-readable storage media. The local storage 508 may be implemented as described above with respect to local storage 124 and/or local storage 130. In this embodiment, the local storage 508 includes an SSD 522 and an HDD 524, which may be implemented as described above with respect to SSD 326, SSD 332 and HDD 328, HDD 334 respectively.

Various computer instructions, programs, files, images, etc. may be stored in local storage 508 for execution by one or more of the respective processor(s) 504 via one or more memories of memory 506. In some examples, local storage 508 includes a magnetic 524. Alternatively, or in addition to a magnetic hard disk drive, local storage 508 can include the SSD 522, a semiconductor storage device, a read-only memory (ROM), an erasable programmable read-only memory (EPROM), a flash memory, or any other computer-readable storage media that is capable of storing program instructions or digital information.

The media used by local storage 508 may also be removable. For example, a removable hard drive may be used for local storage 508. Other examples include optical and magnetic disks, thumb drives, and smart cards that are inserted into a drive for transfer onto another computer-readable storage medium that is also part of local storage 508.

Communications unit 510, in these examples, provides for communications with other data processing systems or devices. In these examples, communications unit 510 includes one or more network interface cards. Communications unit 510 may provide communications through the use of either or both physical and wireless communications links.

I/O interface(s) 512 allows for input and output of data with other devices that may be connected to node 500. For example, I/O interface(s) 512 may provide a connection to external device(s) 518 such as a keyboard, a keypad, a touch screen, and/or some other suitable input device. External device(s) 518 can also include portable computer-readable storage media such as, for example, thumb drives, portable optical or magnetic disks, and memory cards. Software and data used to practice embodiments of the present invention can be stored on such portable computer-readable storage media and can be loaded onto local storage 508 via. I/O interface(s) 512. I/O interface(s) 512 also connect to a display 520.

Display 520 provides a mechanism to display data to a user and may be, for example, a computer monitor.

From the foregoing it will be appreciated that, although specific embodiments have been described herein for purposes of illustration, various modifications may be made while remaining with the scope of the claimed technology.

Examples described herein may refer to various components as "coupled" or signals as being "provided to" or "received from" certain components. It is to be understood that in some examples the components are directly coupled one to another, while in other examples the components are coupled with intervening components disposed between them. Similarly, signal may be provided directly to and/or received directly from the recited components without intervening components, but also may be provided to and/or received from the certain components through intervening components.

What is claimed is:

1. A system comprising:
   an operational cluster located at an operational site, the operational cluster having a first plurality of nodes and a first shared storage pool, the first shared storage pool including local storage of one or more of the first plurality of nodes;
   a recovery cluster, in communication with the operational cluster, and located at a recovery site, the recovery cluster having a second plurality of nodes and a second shared storage pool, the second shared storage pool including local storage of one or more of the second plurality of nodes;
   wherein each node of the first plurality of nodes and each node of the second plurality of nodes comprises a hypervisor, a user virtual machine, and storage;
   an available resource pool, located at the recovery site, comprising a plurality of unallocated nodes, the plurality of unallocated nodes comprising a plurality of unallocated complete nodes, a plurality of unallocated compute nodes, or combinations thereof; and
   a cluster manager, located at the recovery site and in communication with the recovery cluster, configured to, responsive to receipt of an indication of a recovery event from the operational cluster, dynamically add an unallocated compute node of the plurality of unallocated compute nodes to the recovery cluster to support failover.

2. The system of claim 1, wherein the cluster manager is further configured to:
   in response to an indication that the operational cluster is restored, de-allocate the unallocated compute node of the plurality of unallocated compute nodes from the recovery cluster and to the available resource pool.

3. The system of claim 2, wherein the cluster manager is further configured to:
   reassign the unallocated compute node of the plurality of unallocated compute nodes to another recovery site to receipt of another indication of another recovery event from the operational cluster.

4. The system of claim 1, wherein the cluster manager is configured to select the unallocated compute node of the plurality of unallocated compute nodes to dynamically add to the recovery cluster based at least in part on a rack location of the unallocated compute node of the plurality of unallocated compute nodes.

5. The system of claim 1, wherein the cluster manager is configured to select the unallocated compute node of the plurality of unallocated compute nodes to dynamically add to the recovery cluster based at least in part on a rack location of the recovery cluster.

6. The system of claim 1, wherein the cluster manager is configured to select the unallocated compute node of the plurality of unallocated compute nodes to dynamically add to the recovery cluster based at least in part on a comparison between an amount of compute resources provided by the unallocated compute node of the plurality of unallocated compute nodes and an amount of compute resources required by the operational cluster.

7. The system of claim 1, wherein the operational cluster located at the operational site and the recovery cluster located at the recovery site are collocated.

8. The system of claim 1, wherein the operational cluster located at the operational site is remote from the recovery cluster located at the recovery site.

9. The system of claim 1, wherein the operational cluster located at the operational site is located in a cloud, and the recovery cluster located at the recovery site is located on premise.

10. At least one non-transitory computer readable medium comprising instructions which, when executed, cause a computing system to:
    receive an indication of a recovery event from an operational cluster located at an operational site, the recovery event indicative of a failure at the operational cluster, the operational cluster having a plurality of operational nodes and an operational shared storage, wherein the operational shared storage includes local storage of one or more of the plurality of operational nodes; and
    based on receipt of the indication of the recovery event, dynamically add an unallocated compute node of a plurality of unallocated compute nodes to a recovery cluster located at a recovery site, wherein the addition supports failover, and wherein the recovery cluster includes a plurality of recovery nodes and a recovery shared storage, wherein the recovery shared storage includes local storage of one or more of the plurality of recovery nodes.

11. The non-transitory computer readable medium of claim 10, wherein the instructions when executed, further cause the computing system to:
    in response to an indication that the operational cluster is restored, de-allocate the unallocated compute node of the plurality of unallocated compute nodes from the recovery cluster and to an available resource pool located at the recovery site, wherein the available resource pool comprises the plurality of unallocated nodes.

12. The non-transitory computer readable medium of claim 11, wherein the instructions when executed, further cause the computing system to:
    in response to receipt of another indication of another recovery event from the operational cluster, reassign the unallocated compute node of the plurality of unallocated compute nodes located at the available resource pool to another recovery site.

13. The non-transitory computer readable medium of claim 10, wherein the instructions for dynamically adding the unallocated compute of the plurality of compute nodes to the recovery cluster comprises instructions which, when executed, cause the computing system to:
    select the unallocated compute node of the plurality of unallocated compute nodes to dynamically add to the recovery cluster based at least in part on a rack location of the unallocated compute node.

14. The non-transitory computer readable medium of claim 10, wherein the instructions for dynamically adding the unallocated compute of the plurality of compute nodes to the recovery cluster comprises instructions which, when executed, cause the computing system to:
    select the unallocated compute node of the plurality of unallocated compute nodes to dynamically add to the recovery cluster based at least in part on a rack location of the recovery cluster.

15. The non-transitory computer readable medium of claim 10, wherein the instructions for dynamically adding the unallocated compute of the plurality of compute nodes to the recovery cluster comprises instructions which, when executed, cause the computing system to:

select the unallocated compute node of the plurality of unallocated compute nodes to dynamically add to the recovery cluster based at least in part on a comparison between an amount of compute resources provided by the unallocated compute node and an amount of compute resources required by the operational cluster.

16. The non-transitory computer readable medium of claim 10, wherein the operational cluster located at the operational site is remote from the recovery cluster located at the recovery site.

17. A method comprising:

receiving, at a cluster manager located at a recovery site, an indication of a recovery event from an operational cluster located at an operational site; and dynamically adding, by the cluster manager, an unallocated compute node of a plurality of unallocated compute nodes to a recovery cluster located at the recovery site, wherein the addition of the unallocated compute node supports failover.

18. The method of claim 17, further comprising:

de-allocating the dynamically allocated unallocated compute node from the recovery cluster and to an available resource pool located at the recovery site based at least in part on receiving, at the cluster manager and by the operational cluster, an indication that the operational cluster is restored.

19. The method of claim 17, further comprising:

reassigning, based at least in part on receiving another indication of another recovery event from the operational cluster and at the cluster manager, the unallocated compute node to another recovery site, wherein the reassigning supports failover.

20. The method of claim 17, wherein selecting the unallocated compute node of the plurality of unallocated compute nodes to dynamically add to the recovery cluster based at least in part on a rack location of the unallocated compute node.

21. The method of claim 17, where selecting the unallocated compute node of the plurality of unallocated compute nodes to dynamically add to the recovery cluster based at least in part on a rack location of the recovery cluster.

22. The method of claim 17, wherein selecting the unallocated compute node of the plurality of unallocated compute nodes to dynamically add to the recovery cluster based at least in part on a comparison between an amount of compute resources provided by the unallocated compute node and an amount of compute resources required by the operational cluster.

23. The method of claim 17, wherein the operational cluster located at the operational site is remote from the recovery cluster located at the recovery site.

24. The system of claim 1, wherein each complete node of the plurality of complete nodes is a storage-intensive node, and wherein each complete node comprises storage configured to integrate into a storage pool of a cluster.

25. The system of claim 1, wherein each unallocated compute node is a compute-only node, and wherein each unallocated compute node comprises storage configured to remain independent from a storage pool of a cluster.

26. The system of claim 1, wherein the operational cluster is configured to communicate a snapshot comprising redundant storage data for the first shared storage pool, to the recovery cluster, to maintain the second shared storage pool in preparation for the recovery event.

27. The non-transitory computer readable medium of claim 10, wherein each unallocated compute node of the plurality of unallocated compute nodes is a compute-only node, and wherein each unallocated compute node comprises storage configured to remain independent from shared storage of a cluster.

28. The non-transitory computer readable medium of claim 10, wherein the operational cluster is configured to communicate a snapshot comprising redundant storage data for the operational shared storage, to the recovery cluster, to maintain the recovery shared storage in preparation for the recovery event.

29. The method of claim 17, wherein each unallocated compute node of the plurality of unallocated compute nodes is a compute-only node, and wherein each unallocated compute node comprises storage configured to remain independent from a storage pool of a cluster.

30. The method of claim 17, further comprising: receiving, at the cluster manager located at the recovery site, a snapshot comprising redundant storage data for a shared storage pool located at the operational site, to maintain a shared storage pool located at the recovery cluster in preparation for the recovery event.

* * * * *